(12) United States Patent
Moore et al.

(10) Patent No.: US 8,122,446 B2
(45) Date of Patent: *Feb. 21, 2012

(54) METHOD AND APPARATUS FOR PROVISIONING SOFTWARE ON A NETWORK OF COMPUTERS

(75) Inventors: Matthew P. Moore, Palo Alto, CA (US); Jeremy A. Redburn, Somerville, MA (US); Frank Schwichtenberg, Natick, MA (US); Alyssa A. Wolf, Somerville, MA (US); Jeffrey Yasskin, Mountain View, CA (US); Benjamin J. Zeigler, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/266,809

(22) Filed: Nov. 3, 2005

(65) Prior Publication Data

US 2007/0169113 A1 Jul. 19, 2007

(51) Int. Cl.
*G06F 9/445* (2006.01)

(52) U.S. Cl. ........ 717/174; 717/175; 717/176; 717/177; 717/178

(58) Field of Classification Search .......... 717/168–178; 707/100; 709/201–203
See application file for complete search history.

(56) References Cited

U.S. PATENT DOCUMENTS

| | | | | |
|---|---|---|---|---|
| 5,889,989 | A | * | 3/1999 | Robertazzi et al. ........... 718/105 |
| 6,006,248 | A | * | 12/1999 | Nagae ............................ 718/105 |
| 6,301,708 | B1 | | 10/2001 | Gazdik et al. |
| 6,438,749 | B1 | * | 8/2002 | Chamberlain ................. 717/174 |
| 6,442,754 | B1 | | 8/2002 | Curtis |
| 6,453,413 | B1 | | 9/2002 | Chen et al. |
| 6,557,054 | B2 | | 4/2003 | Reisman |
| 6,681,323 | B1 | | 1/2004 | Fontanesi et al. |
| 6,681,391 | B1 | * | 1/2004 | Marino et al. ................. 717/175 |
| 7,042,838 | B1 | * | 5/2006 | Shand et al. ................... 370/225 |
| 7,831,972 | B2 | * | 11/2010 | Moore et al. ................... 718/102 |
| 2002/0002704 | A1 | | 1/2002 | Davis et al. |
| 2002/0144248 | A1 | | 10/2002 | Forbes et al. |

(Continued)

FOREIGN PATENT DOCUMENTS

JP 09-218777 8/1997

(Continued)

OTHER PUBLICATIONS

"A Software Metric System for Module Coupling" by Offutt et al., Journal of Systems and Software, vol. 20, Issue 3, Mar. 1993, 17 pages.*

(Continued)

*Primary Examiner* — S Sough
*Assistant Examiner* — Carina Yun
(74) *Attorney, Agent, or Firm* — Jon A. Gibbons; Fleit Gibbons Gutman Bongini & Bianco PL

(57) ABSTRACT

An apparatus and method for provisioning software on a network of heterogeneous computers in a network. The provisioner receives a list of packages and deployment scope of the packages, then checks each node for installed applications and records dependency and potential application conflicts. In addition, the provisioner measures a plurality of network and node metrics. Based on the dependency information, conflict information, and metrics, one or more nodes are selected and software is provisioned and/or removed in accordance with the dependency and conflict information.

18 Claims, 7 Drawing Sheets

U.S. PATENT DOCUMENTS

| | | |
|---|---|---|
| 2003/0046371 A1 | 3/2003 | Falkner |
| 2003/0120709 A1* | 6/2003 | Pulsipher et al. ............. 709/106 |
| 2003/0187806 A1* | 10/2003 | Banerjee et al. ............. 705/400 |
| 2003/0200541 A1 | 10/2003 | Cheng et al. |
| 2003/0221190 A1* | 11/2003 | Deshpande et al. .......... 717/171 |
| 2003/0236873 A1 | 12/2003 | Chantrain et al. |
| 2004/0015961 A1 | 1/2004 | Chefalas et al. |
| 2004/0019889 A1 | 1/2004 | Melchione et al. |
| 2004/0049509 A1* | 3/2004 | Keller et al. .................. 707/100 |
| 2004/0088398 A1 | 5/2004 | Barlow |
| 2004/0213159 A1* | 10/2004 | Helgesen ...................... 370/238 |
| 2004/0243699 A1* | 12/2004 | Koclanes et al. ............. 709/224 |
| 2005/0034111 A1* | 2/2005 | Martin et al. ................. 717/141 |
| 2005/0091366 A1* | 4/2005 | Acharya ....................... 709/224 |
| 2005/0132350 A1* | 6/2005 | Markley et al. ............... 717/168 |

FOREIGN PATENT DOCUMENTS

JP        10-301786        11/1998

OTHER PUBLICATIONS

Chaiet, R.R., Shoup, L.W., "Automated Replacement of System Software Units," IBM Technical Disclosure Bulletin, vol. 13, No. 10, Mar. 1971, pp. 3137-3138.

IBM Research Disclosure, "Automatically Configuring a Server Blade Environment Using Positional Deployment," No. 450119, Oct. 2001.

* cited by examiner

METHOD AND APPARATUS FOR PROVISIONING SOFTWARE ON A NETWORK OF COMPUTERS

CROSS REFERENCE TO RELATED APPLICATION

This application is related to the inventor's application "METHOD AND APPARATUS FOR SCHEDULING JOBS ON A NETWORK," Ser. No. 11/266,804, now U.S. Pat. No. 7,831,972, which was filed on the same day as the present application and commonly assigned herewith to International Business Machines Corporation. This related application is incorporated herein by reference in its entirety.

FIELD OF THE INVENTION

This invention relates generally to computer networks and more particularly to a method and apparatus for managing software on a network of heterogeneous computing devices.

DESCRIPTION OF RELATED ART

Distributed systems are highly-available, scalable systems that are particularly utilized in situations that require a high-throughput of work or continuous or nearly continuous availability of the system.

A distributed system that has the capability of sharing resources is referred to as a cluster. A cluster includes operating system instances, which share resources and collaborate with each other to coordinate and perform system tasks to maximize system resources. To facilitate efficient coordination, schedulers are utilized to distribute jobs among the system resources.

Currently, schedulers have fairly limited options as to how they can optimize jobs. Most schedulers consider only the machines in the cluster that currently have the applications needed to run the desired processes. That is, most schedulers are not programmed to consider the option of installing an application on a machine and then assigning the job to that device. In many instances, this would be advantageous over assigning the job to an over-utilized machine having the pre-installed application.

In addition, most schedulers either have rigidly defined groups of machines, each group with the capability of running certain types of jobs, or assume that all jobs can run on all machines, thereby forcing homogeneous systems. Even advanced systems, such as IBM Tivoli Intelligent ThinkDynamic Orchestrator (ITITO) or the University of Wisconsin's Condor, are not programmed to consider and carry out provisioning of software on individual machines as a scheduling option.

Administrators are given two choices for provisioning the systems. The first is "granular" provisioning, whereby a system administrator manually installs each required application onto individual computers. This strategy is obviously inefficient. The second provisioning model is the "role-based" or "image-based" model, used for example, in IBM's Tivoli Provisioning Manager (TPM). This solution entails defining complete software stacks to install on various machines, each of which is assigned one or more roles. This automation saves administrator time and works well for existing grid users who tend to have predefined software stacks. However, image-based provisioning models do not work well for machines that utilized constantly changing applications (new revisions, new software). The image-based provisioning models lose the fine-grained control inherent in the granular-provisioning model and therefore, do not work well when applied to the problem of scheduling across networks of heterogeneous nodes.

Thus, a need exists for a provisioner that enables provisioning across heterogeneous application stacks, operating systems, and machine types.

SUMMARY OF THE INVENTION

Briefly, in accordance with the present invention, disclosed is an apparatus and method for provisioning software on a plurality of computational nodes in a distributed information processing system. The apparatus includes a LAN interface for receiving a list of software modules in a software package for installation onto at least one of a plurality of computational nodes, where the nodes are communicatively coupled together over a network. The apparatus also includes a memory for storing information pertaining to dependencies between the list of software modules for installation and any software module installed on a given node of the plurality of nodes. The apparatus further includes a comparator for selecting at least one node in the plurality nodes for installation of the software modules in response to the list of dependencies being below a given threshold.

In one embodiment of the present invention, the apparatus includes a package repository, which is used for installing the software module on the selected nodes.

In another embodiment of the present invention, the LAN interface further includes means for receiving from each selected node, a message indicating a result of the installation.

The present invention also includes means for uninstalling software on a selected node according to the dependencies.

The present invention further includes a user interface for presenting to a user an identifier of each node that is selected and receiving user input indicating which software is to be installed on the selected nodes, as well as a means for sending either a software module to install and/or an identification of software to remove, to at least one selected node, according to the user input.

In one embodiment of the present invention, the list includes one or more metrics, which include at least one of provisioning latency and licensing cost.

The present invention also includes a method for provisioning software on a plurality of computational nodes in a distributed information processing system. The method is run on a node manager and includes receiving a list of software modules in a software package for installation onto at least one of a plurality of computational nodes communicatively coupled together over a network; receiving a list of nodes eligible to receive the software modules for installation, wherein the list includes any dependencies between the list of software modules for installation and any software module installed on a given node of the plurality of nodes; and selecting at least one node in the plurality nodes for installation of the software modules in response to the list of dependencies being below a given threshold.

The method also includes installing the software module on the selected nodes and then receiving from each selected node, a message indicating a result of the installation.

In yet another embodiment of the present invention, the method includes presenting to a user interface an identifier of each node that is selected; receiving user input indicating which software is to be installed on the selected nodes; and sending at least one of a software module to install and an identification of software to remove, to at least one selected node, according to the user input.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF THE PREFERRED EMBODIMENTS

Figure 1:
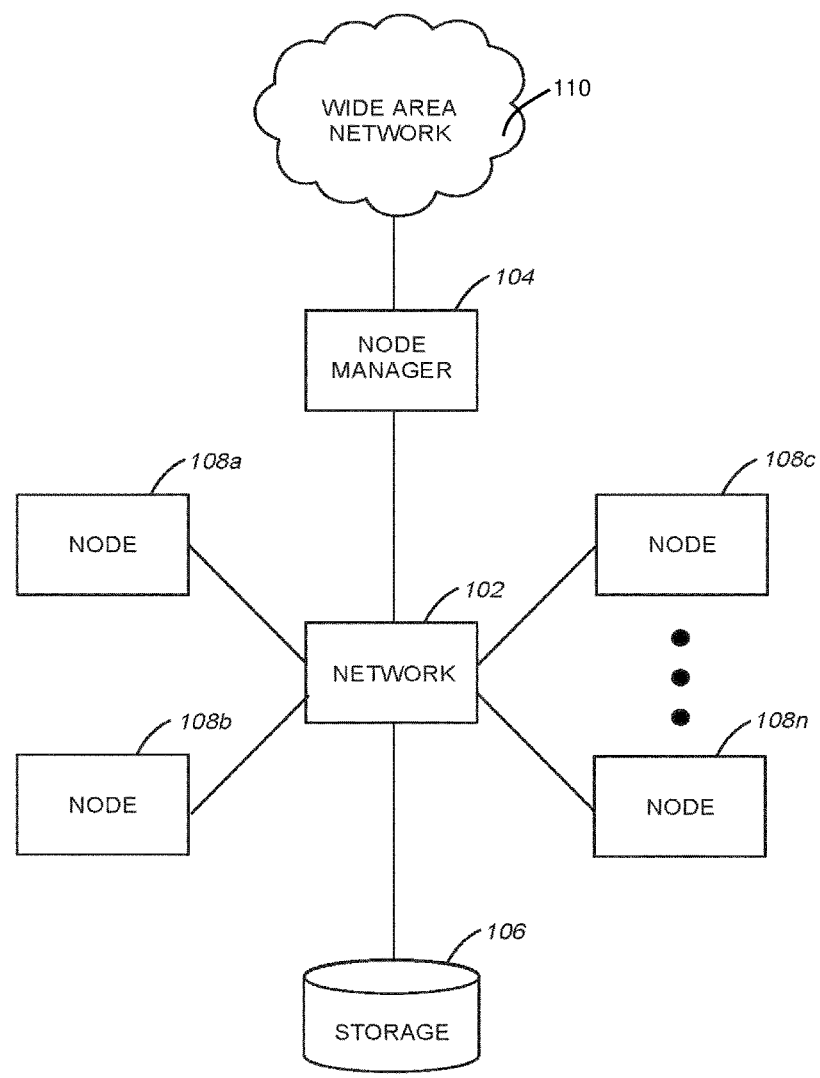
FIG. 1 is a block diagram illustrating a distributed data processing system in which an embodiment of the present invention can be implemented.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to an embodiment, overcomes problems with the prior art by providing a method and system for determining where to execute a job based on the current state of all known machines in a distributed system, as well as the known or estimated cost of installing and configuring the required applications. The present invention also provides a unified structure for automatically installing, configuring, un-installing, and managing software on a network of homogenous or heterogeneous computers within a distributed system.

Distributed Data Processing System

With reference to FIG. 1, a distributed data processing system 100 is depicted in which the present invention may be implemented. A distributed data processing system is a network of computers in which the present invention may be implemented. The distributed data processing system 100 includes a network 102, which is the medium used to provide communications links between nodes 108a-108n (various computers and devices) connected together within the distributed data processing system 100. The network 102 may include wired or wireless connections. A few exemplary wired connections are cable, phone line, and fiber optic. Exemplary wireless connections include radio frequency (RF) and infrared radiation (IR), transmission. Many other wired and wireless connections are known in the art and can be used with the present invention.

In one embodiment of the present invention, the distributed data processing system 100 is connected to other distributed data processing systems through a wide area network 110. Wide area network 110 typically includes various network devices such as gateways, routers, hub, and one or more local area networks (LANs) that are interconnected with various media possibly including copper wire, coaxial cables, fiber optic cables, and wireless media. Wide area network 110 may represent or include portions of the Internet. As is known in the art, the Internet includes a backbone of high-speed data communication lines between major nodes or host computers, consisting of thousands of commercial, government, educational and other computer systems that route data and messages. In another embodiment of the present invention, the distributed data processing system 100 is implemented as one or more types of networks, such as for example, an intranet, a local area network (LAN), or a wide area network (WAN).

Also shown in FIG. 1 is a node manager 104 connected to the network 102. In addition, a storage unit 106 and computational nodes 108a-108n also are connected to the network 102. In distributed computing systems, multiple server and client devices can be used and the present invention is not limited to any particular number of devices. The computational nodes 108a-108n may be, for example, personal computers or network computers. A network computer is any computer, coupled to a network, which receives a program or other application from another computer coupled to the network either permanently or temporarily.

In the system shown in FIG. 1, computational nodes 108a-108n are clients to server 104. In other embodiments, one or more of the computational nodes 108a-108n can be clients to other servers connected to the network 102. The server 104 is able to communicate with the client device to provide data, such as operating system images, and applications to the client devices 108a-108n and to measure and capture device metrics of the client devices.

The present invention can be used with heterogeneous or homogeneous systems. The term "heterogeneous" is commonly used to describe an environment in which the individual devices can have different hardware, application stacks, operating systems, and more. Conversely, the term "homogenous" is used to describe an environment in which the individual devices have similar hardware, application stacks, operating systems, and more.

Cluster

Figure 2:
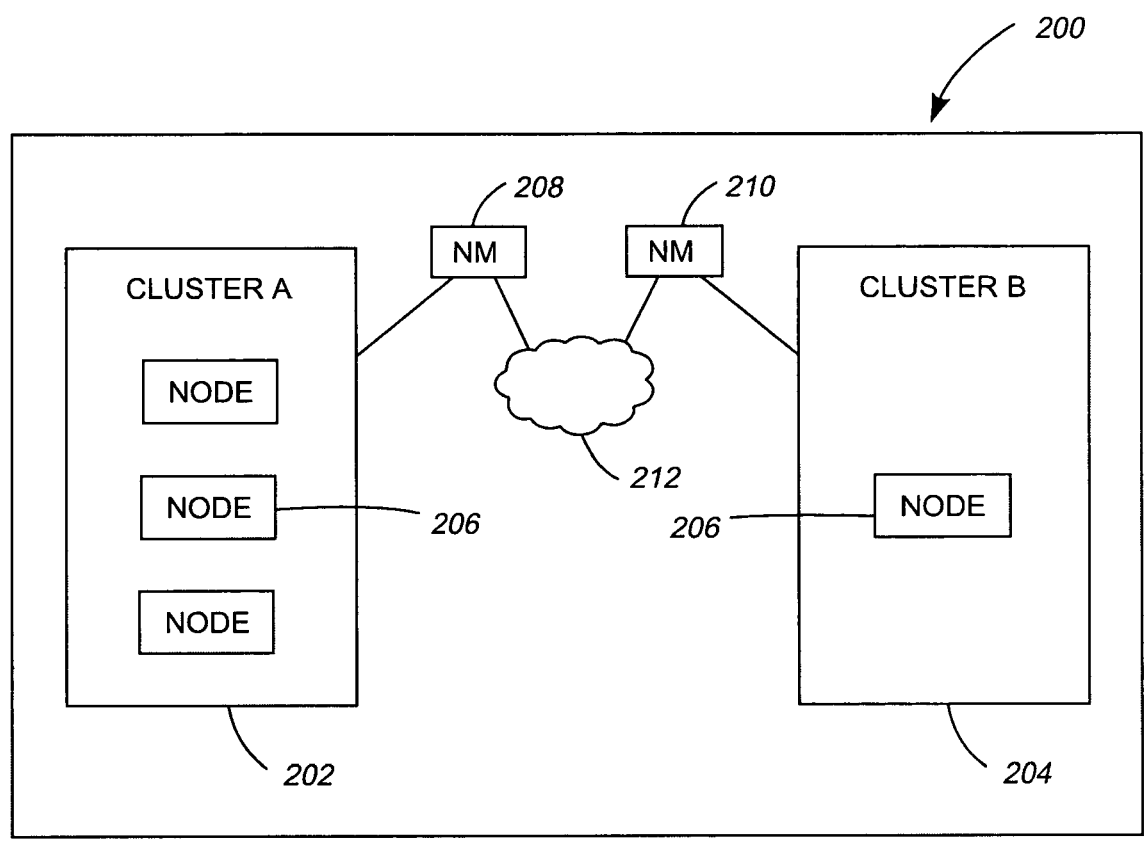
FIG. 2 is a block diagram illustrating one embodiment of a computing environment having a plurality of clusters, in accordance with an aspect of the present invention.

A distributed computing environment, which has the capability of sharing resources, is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks.

Each cluster of nodes 202 and 204 is managed by a node manager 208 and 210, respectively. One of the node managers 208 can be communicatively coupled to the other node manager 210 through a wide area network 212.

Node Manager Operating System

The node manager 104 depicted in FIG. 1, to which the nodes are coupled, may be, for example, an IBM RISC/System 6000 system, a product of International Business Machines Corporation in Armonk, N.Y., running the Advanced Interactive Executive (AIX) operating system. The node manager can also run any of a number of other computer operating systems. Well-known operating systems include, for example, Novell NetWare, IBM OS/2 Warp Server, IBM AS/400, Microsoft Windows NT, and many variations of OSF UNIX. The server system is able to access the client systems for specific functions, which include, but are not limited to, storage, installation and/or execution of applications and execution of processes.

Nodes

Figure 3:
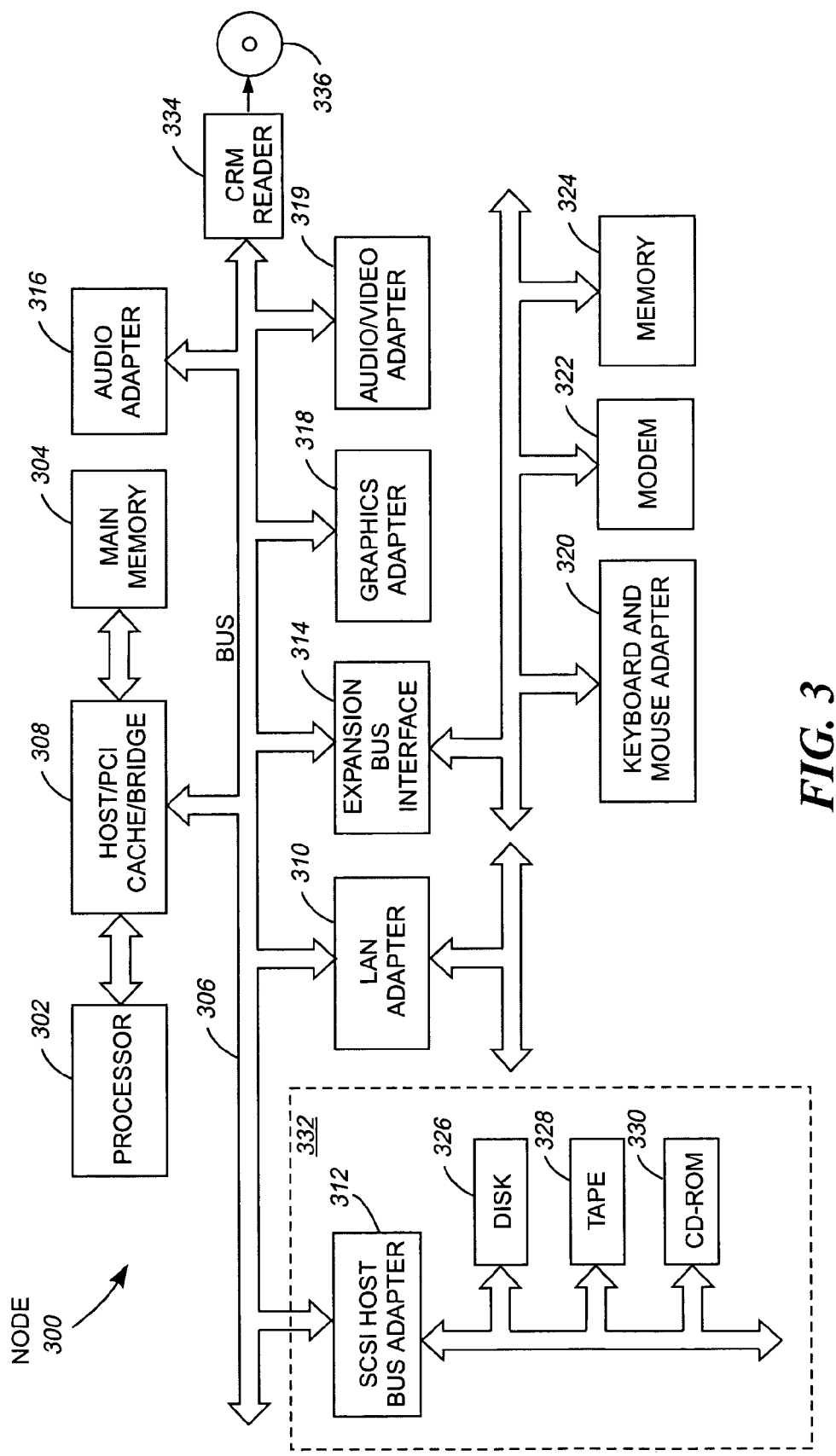
FIG. 3 is a block diagram illustrating a data processing system that may be implemented as a client, according to embodiments of the present invention.

Referring now to FIG. 3, a block diagram illustrating a node information processing system, in accordance with one embodiment of the present invention, is shown. The node information processing system 300 is a data processing system that employs a peripheral component interconnect (PCI) local bus architecture. It should be noted that alternate bus architectures, such as Micro Channel and ISA, may also be used. A processor 302 and a main memory 304 are connected to the PCI local bus 306 through a PCI bridge 308. The PCI bridge 308 may also include an integrated memory controller and cache memory for processor 302. Additional connections to PCI local bus 306 may be made through direct component interconnection or through add-in boards. In one embodiment of the present invention, a local area network (LAN) adapter 310, a SCSI host bus adapter 312, and an expansion bus interface 314 are connected to the PCI local bus 306 by direct component connection. In contrast, audio adapter 316, graphics adapter 318, and audio/video adapter 319 are connected to PCI local bus 306 by add-in boards inserted into expansion slots. The expansion bus interface 314 provides a connection for a keyboard and mouse adapter 320, a modem 322, and additional memory 324. The SCSI host bus adapter 312 provides a connection for hard disk drive 326, tape drive 328, and CD-ROM drive 330. Additional PCI expansion slots or add-in connectors can also be supported.

Those of ordinary skill in the art will appreciate that the hardware shown in FIG. 3 is exemplary and hardware used in other embodiments may vary from that shown in FIG. 3 and described above, depending on the implementation. Additionally, the processes of the present invention may be applied to a data processing system 300 having two or more multi-processors.

In one embodiment of the present invention, the node information processing system 300 is configured as a network computer and, therefore does not have or require a SCSI host bus adapter 312, a hard disk drive 326, a tape drive 328, or a CD-ROM 330, all denoted by a dotted line 332 in FIG. 3. In this embodiment, the client computer includes some type of network communication interface, such as a LAN adapter 310, a modem 322, or the like.

Software and Computer Program Medium

In one embodiment of the present invention, a device 334, such as a CDROM drive, capable of reading a computer-readable medium 336, is connected to the PCI local bus 306. In this document, the terms "computer program medium," "computer-usable medium," "machine-readable medium," "computer program product" and "computer-readable medium" are used to generally refer to media such as non-volatile program memory, data memory, removable storage drive, and a hard disk installed in a hard disk drive. These computer program products are means for providing software to the node information processing system 300. The computer-readable medium allows the node information processing system 300 to read data, instructions, messages or message packets, and other computer-readable information from the computer-readable medium. The computer-readable medium, for example, may include non-volatile memory, such as floppy, ROM, flash memory, disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Various software embodiments are described in terms of this exemplary system. After reading this description, it will become apparent to a person of ordinary skill in the relevant art(s) how to implement the invention using other computer systems and/or computer architectures.

Client Operating System

The processor 302 is utilized to run an operating system that coordinates and controls various components within the data processing system 300 in FIG. 3. One example of an operating system is OS/2, which is commercially available from International Business Machines Corporation. "OS/2" is a trademark of International Business Machines Corporation. Additionally, an object-oriented programming system such as Java may run in conjunction with the operating system and provides calls to the operating system from Java programs or applications executing on the data processing system 300. "Java" is a trademark of Sun Microsystems, Inc. Instructions for the operating system, the object-oriented operating system, and applications or programs are located on storage devices, such as hard disk drive 326, and may be loaded into the main memory 304 for execution by the processor 302.

Provisioning Framework

The present invention provides a provisioning framework with a unified infrastructure for automatically installing, configuring, un-installing, and managing software on a network of heterogeneous computers, or "nodes." The framework of the present invention is able to install different versions of applications, patches and configuration information and is extensible enough to do this across any combination of computer hardware and operating systems.

Figure 4:
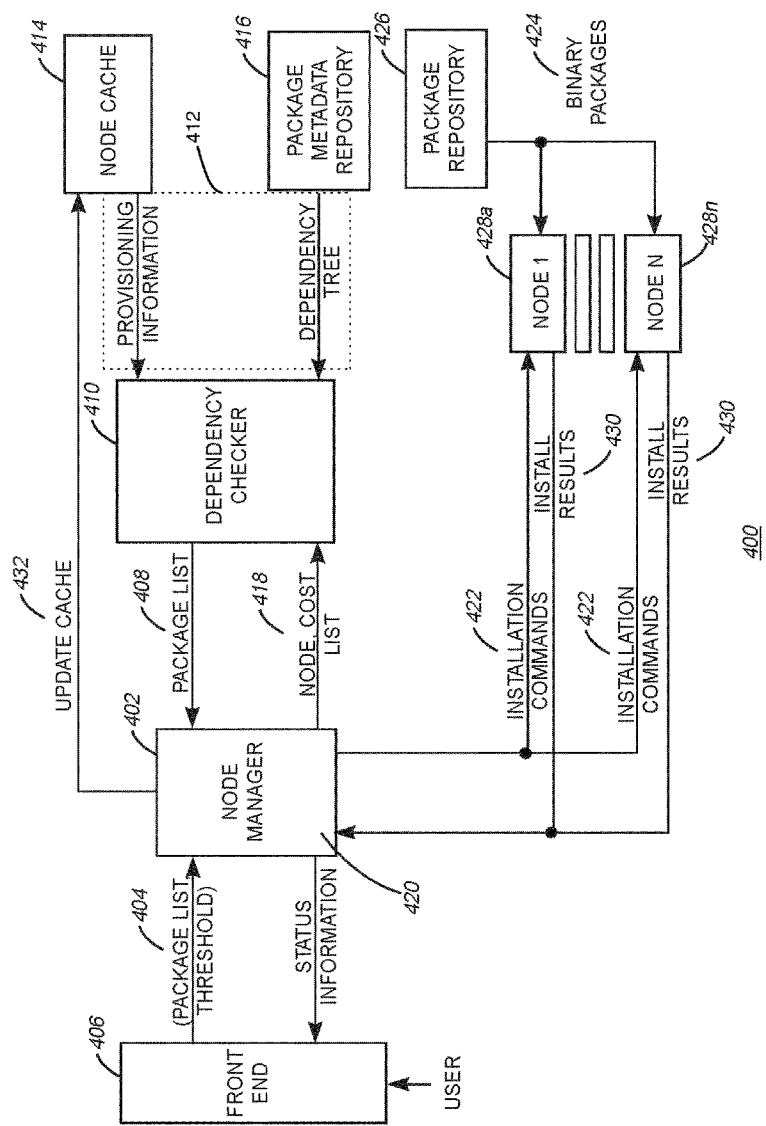
FIG. 4 is a block diagram and a process flow diagram of a provisioning framework, according to an embodiment of the present invention.

Referring now to FIG. 4, the components of a provisioning framework 400 according to the present invention are shown. Also illustrated in FIG. 4 is the process flow between the components within the framework 400. The framework 400 includes a node manager 402 that communicates with and coordinates the other components in the framework 400. At step 404, a list of required packages and deployment scope is delivered to the node manager from a front end 406. In one embodiment, the front end 406 is a typical client device. In another embodiment, the front end 406 is a "scheduler," as will be explained below. In step 408, the node manager 402 sends the list of software packages and deployment scope to a "dependency" checker 410.

"Dependency" refers to the degree to which one program module or software application relies on another module. Dependency can have "low" or "high" "coupling." If the coupling is "low," internal implementation of another module is not an issue and the modules are able to interact with a stable interface. In the case of low coupling, changes to one module do not require a change in the implementation of another module. However, improved efficiency can be gained by utilizing a highly coupled system. In the case of high coupling, careful attention must be given to the applications being added or upgraded on each machine.

A few exemplary types of coupling (from lowest to highest) are as follows:

Data coupling—Data coupling is when modules share data through, for example, parameters. Each datum is an elementary piece, and these are the only data which are shared (e.g. passing an integer to a function which computes a square root).

Stamp coupling (Data-structured coupling)—Stamp coupling is when modules share a composite data structure, each module not knowing which part of the data structure will be used by the other (e.g. passing a student record to a function which calculates the student's GPA).

Control coupling—Control coupling is one module controlling the logic of another, by passing it information on what to do (e.g. passing a what-to-do flag).

External coupling—External coupling occurs when two modules share an externally imposed data format, communication protocol, or device interface.

Common coupling—Common coupling is when two modules share the same global data (e.g. a global variable).

Content coupling—Content coupling is when one module modifies or relies on the internal workings of another module (e.g. accessing local data of another module).

In object-oriented programming, subclasses can be coupled where a parent class is coupled to its child.

Dependency is also used to describe relationships in software package management. One software package may depend on other software packages and often depends on a particular version of another software package. The Apt package format, as well as some versions of the RPM package format, include dependency information between packages.

The dependency checker 410 is able to identify current or potential dependencies and, as a result, determine current or potential conflicts caused by the dependencies. In step 412, the dependency checker 410 determines all nodes that are eligible for the proposed job. The dependency checker 410 pulls information on the state of each machine by querying a node cache 414. The node cache 414 stores information pertaining to the state of each machine in the node. Simultaneously, in step 412, the dependency checker 410 pulls package data, such as dependency and conflict information, from a package metadata repository 416 to determine what packages would need to be installed to successfully install the package list received in step 404.

For example, suppose the network consists of a server and three computers, or nodes. When querying to see what is installed, the dependency checker 410 gets a list of packages installed on each node 428a-428n. In this example, Node A has DB2 version 8.1; Node B has Java version 1.4.2 and Websphere version 5; and Node C has Websphere version 5, DB2 version 7.1, and Modeler version 0.9 installed. Querying the metadata repository 416, dependency information, conflicts, package size, license costs, and others are obtained for each package. Table 1 below shows an example of metadata describing this situation.

TABLE 1

| Package Name | Package Version | Package Size (kilobytes) | License Cost (USD) | Dependencies | Conflicts |
|---|---|---|---|---|---|
| Modeler | 1.0 | 400 | 4000 | Websphere => 4<br>DB2 => 8.1 | Modeler < 1.0 |
| Modeler | 0.9 | 380 | 4000 | Websphere => 4<br>DB2 => 7.0 | |
| DB2 | 8.1 | 4000 | 2500 | | DB2 < 8.1 |
| DB2 | 7.1 | 4000 | 2000 | | DB2 < 7.1 |
| Websphere | 5 | 3000 | 3000 | | |

Figure 5:
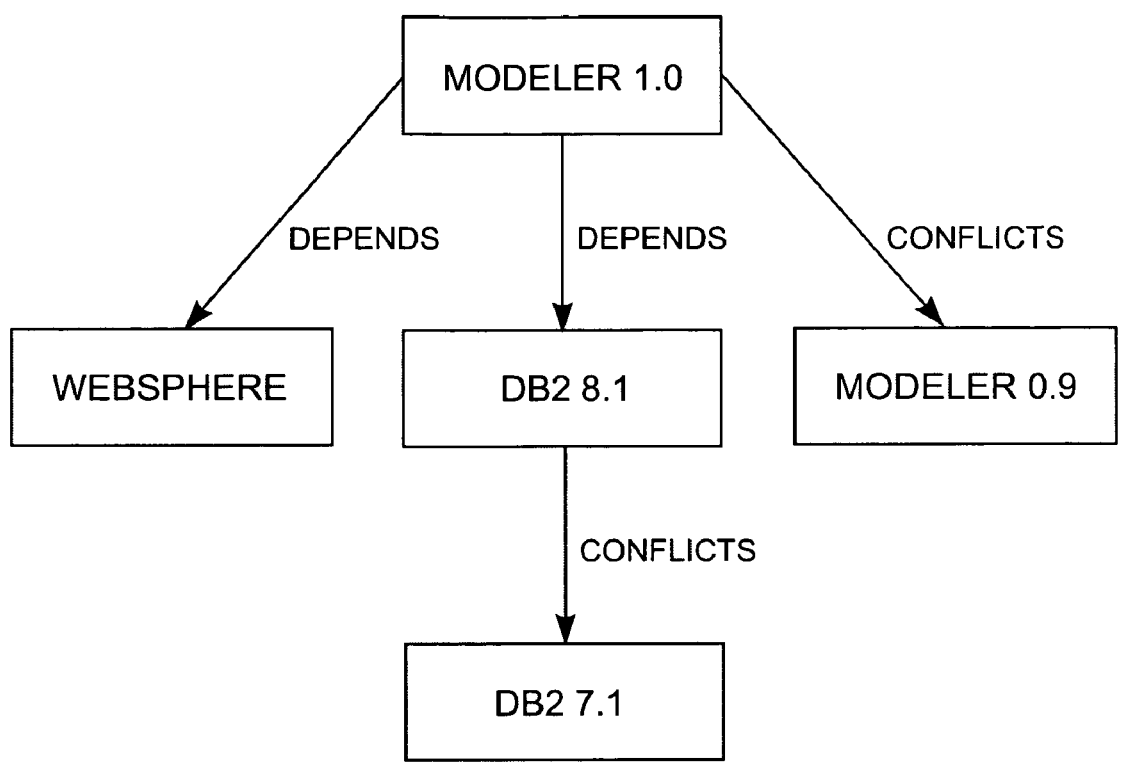
FIG. 5 is a visual representation of a dependency tree, in accordance with an embodiment of the present invention.

FIG. 5 shows a constructed dependency tree 500 that illustrates the dependencies around Modeler 1.0. The dependency tree is a visual representation of the data in table 1 above. Websphere and DB2 8.1 depend from Modeler 1.0. However, Modeler 0.9 conflicts with Modeler 1.0 and, therefore, Modeler 0.9 would have to be removed. In addition, DB2 7.1 conflicts with DB2 8.1 and would also have to be removed. As explained above, some dependency conflicts can exist without seriously adversely affecting a program. To determine the amount of coupling that is to be reached before two processes are not allowed to exist or run on the same node, a threshold value can be pre-selected. The dependency can be compared to this value and software will be installed if the dependency coupling is below the threshold value.

Next, in step 418, the dependency checker 410 returns the list of eligible nodes to the node manager 402. The list includes projected costs for things such as provisioning latency, license costs, disk usage, and others. Table 2 shows a cost list for the example given above.

TABLE 2

| Node Name | # Packages to Install | # Packages to Upgrade | License Cost (USD) | Disk Space (kilobytes) |
|---|---|---|---|---|
| Node A | 2 | 0 | 7000 | 34000 |
| Node B | 2 | 0 | 6500 | 4400 |
| Node C | 0 | 2 | 500 | 20 |

The node manager 402 then, in step 420, determines the best nodes for provisioning, based on the projected costs and weighted metrics. The determination can be made with a comparator that compares the costs of provisioning a new application on a node. Looking at the example shown in Table 2, use of Node A would require installation of Websphere and Modeler 1.0; use of Node B would require installation of DB2 and Modeler 1.0; and use of Node C would require upgrade of DB2 and upgrade of Modeler 0.9. In the case of a fully automated provisioning system, the optimal nodes(s) would be determined by a set of policies and provisioned with the applications required. In the case of a wizard driven model, the list of nodes would be presented to a system administrator or other user via a user interface, such as a computer terminal, and the administrator would be able to provide user input to edit the provisioning plan before it is implemented. A system administrator might make decisions base on knowledge of the network and the users. Knowing that money is a heavily weighted factor, the administrator might opt to use Node C and keep licensing costs down by doing upgrades. Alternatively, knowing that one of the users frequently uses Modeler 0.9, the administrator might chose to install Modeler 1.0 on a different machine and pay the extra license fees. The policy engine could also have its own rules to try to optimize for saving disk space, saving license fees, or some combination of the two.

In step 422, the targeted nodes 428a-428n are sent a list of packages to install. Next, in step 424, a package repository 426 provides to the nodes 428a-428n the actual binary packages which are to be installed on the nodes. This could also include configuration packages, which are packages that include configuration files to be installed along with the applications for the purpose of changing the default configuration of those applications.

In step 430, each targeted node separately reports the result of the installation. Finally, in step 432, the node manager 402 notifies the node cache 414 of the results. Additionally, throughout the process, the state of the system 400 is passed through to the node manager 402 who updates the front end 406 with status information.

An exemplary un-installation (or upgrade) would take place as follows. The provisioning framework decides that the optimal installation path involves upgrading or installing existing packages. It is initially determined whether upgrading or installing is possible. This determination involves recursively traversing the dependency tree of the package in question to ensure that any packages and jobs depending on that package do not conflict with the proposed upgrade or install. The node manager would then send the complete list of packages to be removed to the target node, which would perform the requested operation.

Figure 6:
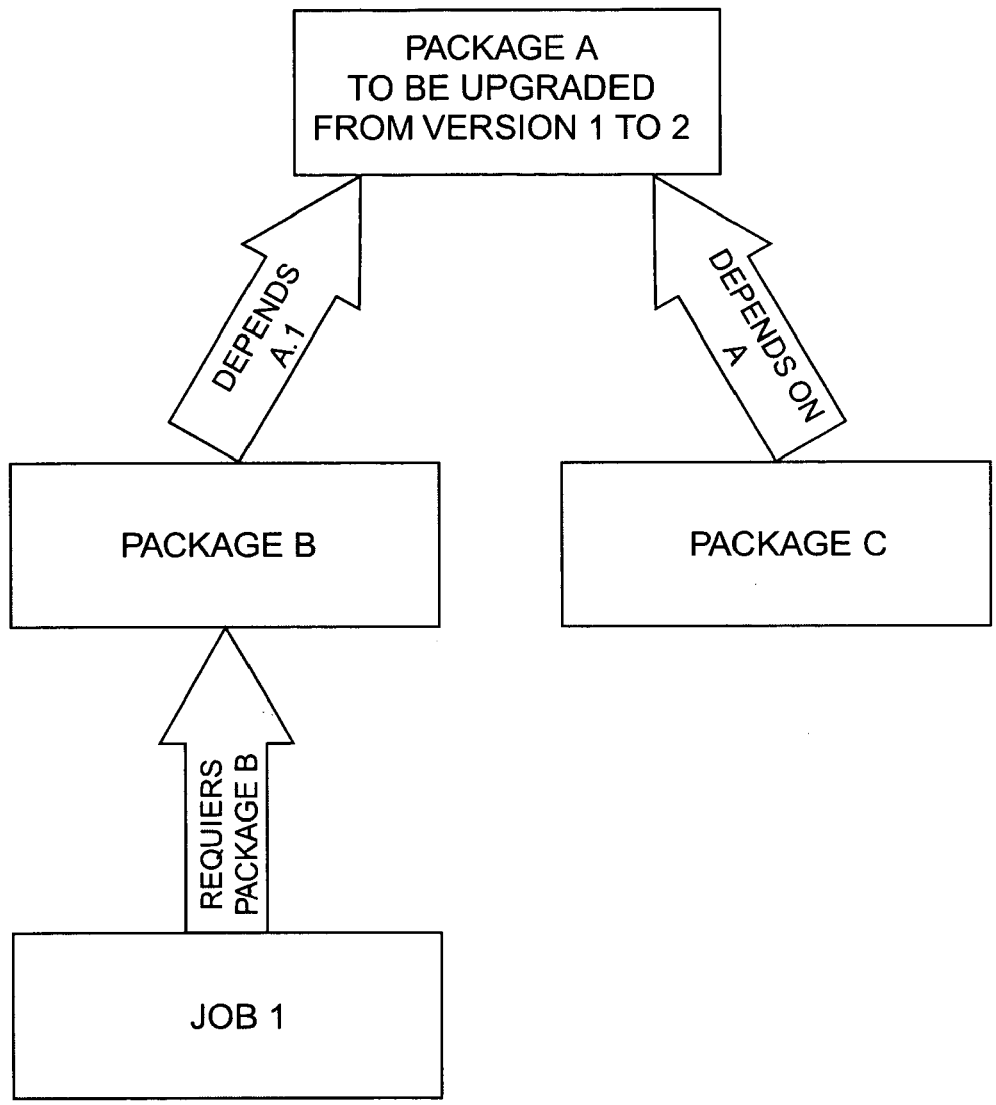
FIG. 6 is a visual representation of a dependency tree, in accordance with an embodiment of the present invention.

As an example, FIG. 6 shows a sample dependency tree 600. Package A needs to be upgraded, but package B and package C depend on package A. Going recursively through these packages, it is determined that package B requires the current version of A, and there is a job running which requires package B. Package C is more flexible, and does not need to change. Therefore, the options for package B are to upgrade it to a version using A.2, or remove it once Job 1 is finished. This decision is made by the node manager based on the need for instances of Package B on the machine. Then the list of commands, for example, "upgrade A from version 1 to version two, uninstall B," would be sent to the machine as soon as job 1 was finished.

However, in order for the provisioning framework to install, configure, un-install, and manage software on the network, it must receive instructions to do so. These instructions come from a "scheduler."

Scheduler

A task scheduler is able to allocate the execution of CPUs within a distributed system to a number of different tasks. Some of those tasks are applications and some of them are operating system tasks, batch files, scripts and much more. Scheduling across networks of heterogeneous nodes requires an intelligent scheduler; one which is aware of the state of software on a machine, and which can make use of this information by provisioning additional software when and where it is needed. The present invention improves upon existing schedulers by enabling the scheduling of a job onto operating environments that do not support the requirements of the job. The present invention is able to optimize workflows across heterogeneous nodes and is able to communicate with the provisioning framework 400 to determine if a node could be provisioned to run a job, and then decide on the best strategy—running the job on existing capable nodes or provisioning new nodes.

Figure 7:
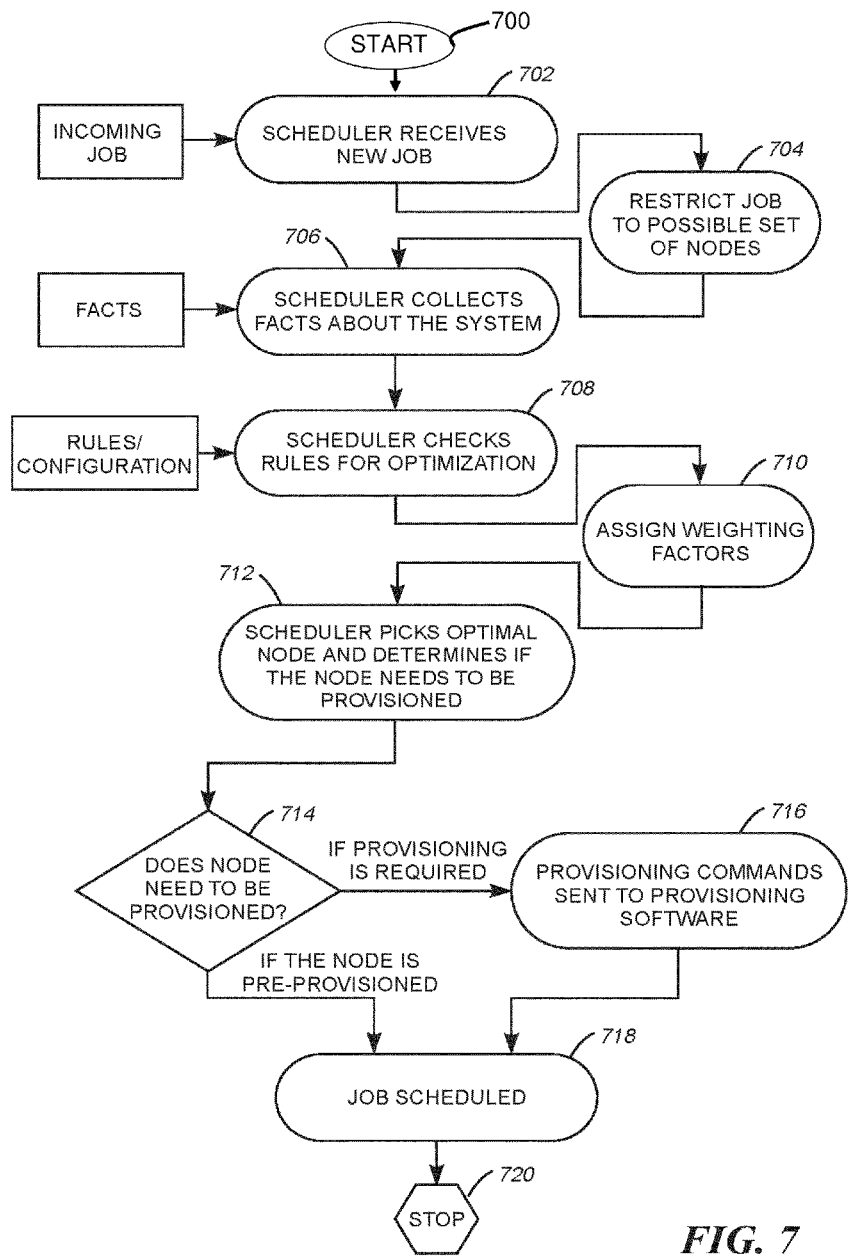
FIG. 7 is a process flow diagram of a scheduler, according to an embodiment of the present invention.

With reference to FIG. 7, a flow chart of the scheduling process, according to the present invention, is shown. The flow begins at step 700 and moves directly to step 702, where a job to be scheduled for execution on at least one of a plurality of computational nodes communicatively coupled together is submitted to the scheduler. In one embodiment, the scheduler resides in a server. In step 704 the scheduler invokes a provisioning framework 400 that surveys the plurality of computational nodes in the distributed system and measures a set of predefined metrics. The survey includes, among other things, the location of each resource and available hardware on each device. The survey allows the possible set of nodes onto which the job may be scheduled to be restricted to the set known operating environments that could support the requirements of the job. For example, some jobs may be required to run under a particular set of hardware or location requirements.

Next, in step 708, the scheduler communicates with a provisioning framework, which gathers metrics indicating facts about the system, including, but not limited to, scheduling metrics such as CPU load, CPU capacity, memory load, memory capacity, disk usage, network speed of the individual systems, characteristics of the network as a whole, and information pertaining to the queue of incoming jobs, such as quantity and type of incoming processes. In addition, the provisioning framework gathers additional facts including, but not limited to, the software stacks of the targeted systems and the set of applications currently installed and those that would need to be provisioned on each computing environment in order to support the job. Furthermore, the disk, processor, memory requirements and license costs of each required application and its dependencies is added to the set of facts. Finally, the historical time taken to provision each known application may provide insight as to how much time may be required to install the application in the future. The historical time may include an average, median or highest time of past installs and can factor in installation time on a single node or more that one node.

Using the gathered facts, the present invention next looks, in step 710, at the configuration and assigns them predefined weighting factors, which may be updated periodically via any number of methods (HTTP, web service, command line, etc). In one embodiment, the weighting factors are hardwired and do not change. The weighting factors allow the scheduler to mathematically determine where to schedule each job. Each weighting factor represents a cost for running a process on a particular node. For example, as is shown in Table 3 below, the configuration could be such that high-priority jobs do not take into account license costs, thereby expanding the number of available machines by including those machines that do not have the application preinstalled, i.e., the license has already been paid. Therefore, the licensing cost is multiplied by zero. In this example, the processor speed is a very important aspect to deciding where to schedule the job, so processor speed is weighted by a factor of 4. This may reduce the number of potential device to schedule the job on. Finally, available memory is a factor that should be considered, and is therefore assigned a weighting factor of 2.

TABLE 3

| Metric | Weighting Factor |
|---|---|
| Licensing Cost | 0 |
| Processor Speed | 4 |
| Available Memory | 2 |

In step 712, the factors, along with their assigned weights, are evaluated and compared and a selection is made as to which operating environment the job should be scheduled onto. The selector, which makes this decision, can be a user, a computer that automatically selects based on a pre-programmed set of instructions, or a circuit. Once the scheduler has made a decision as to which operating environment the job should be scheduled onto, the next step, 714, is to check whether that system is fully provisioned to support the job. If it is not fully provisioned, the present invention, in step 716, utilizes the provisioning framework to provision the required applications onto the targeted environment. Once the environment is successfully provisioned, or if it is already provisioned, the scheduler, in step 718, adds the job to the environment's run queue. The process stops at step 720.

An example scenario is as follows: A new job requiring "Application A" is submitted to the scheduler by a user. The scheduler checks the states of the nodes in the system it manages and determines that the job could be scheduled. For instance, Application A is installed on one server, but that server is being heavily used by other jobs. The scheduler is then faced with the choice of running the job on an overused machine or provisioning another instance of Application A. It is here that the cost metrics are used. The scheduler looks at the cost of running the job on a slow machine (long time to completion) versus installing the application on a machine with spare cycles (installation cost). In this case, Application A has a fairly high license cost but it is also flagged as a high priority job. The scheduler queries the various machines to determine installation cost in terms of time, disk use etc. and then the checks the facts it has gathered (job priority, costs of time, disk, software licenses etc) against the metrics it has been configured with. If the resulting determination is that the need to save on license costs trumps the urgency of the job, the scheduler would simply schedule the job on the pre-provisioned machine. Otherwise, if the urgency of the job trumps the desire to save money, the scheduler will pick a node to install Application A upon, based on the installation costs previously gathered. The scheduler then invokes the provisioning framework to provision Application A on that node. As soon as the provisioning framework returned successfully, the scheduler will schedule the job on the newly provisioned machine.

CONCLUSION

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. An apparatus for provisioning software on a plurality of computational nodes in a distributed information processing system, the apparatus comprising:
 a LAN interface configured to receive
  a list of software modules in a software package for installation onto at least one of a plurality of computational nodes communicatively coupled together over a network; and
  a list of eligible computation nodes to receive the software modules for installation;
 a memory configured to store a set of information comprised in the list of nodes, wherein the set of information comprises information pertaining to dependencies between the list of software modules for installation and any software module installed on a given node of the plurality of nodes, wherein the list of nodes further comprises a set of installation metrics for each node in the list of nodes, wherein the set of installation metrics comprises at least a provisioning latency metric;
 a processor
  configured to assign a weight to each installation metric in the set of installation metric based on a set of provisioning policies; and
  configured to determine, for each node in the list of nodes, a cost factor associated with installing the software modules on the node based on each installation metric in the set of installation metrics and the weight assigned to each installation metric; and
 a comparator configured to select at least a first node in the plurality nodes for installation of the software modules based at least on the cost factor that has been determined for the at least first node;
 the processor further
  configured to install at least one software module in the list of software modules on the first node;
  configured to receive a job to be scheduled for execution on the first node;
  configured to determine that the job is dependent on the at least one software module;
  configured to determine that an availability of a set of resources necessary for executing the job on the first node is less than an availability of a set of resources on at least a second node in the plurality of nodes;
  configured to analyze, in response to determining that the availability of the set of resources necessary for executing the job on the first node is less than an availability of a set of resources on at least the second node, the second node;
  configured to determine, in response to the analyzing, that the second node fails to comprise the software module;
  configured to determine a first computational cost associated with the first node based on the availability of set of resources at the first node;
  configured to determine a second computational cost associated with the second node based on the set of installation metrics associated with installing the software application on the second node, wherein the set of installation metrics further comprises at least installation time of the software application;
  configured to compare the first computational cost with the second computation cost; and
  configured to select among the first and second nodes the node with a lowest computational cost factor for executing the job.

2. The apparatus according to claim 1, further comprising: a package repository used for installing the software module on the at least first node that has been selected.

3. The apparatus according to claim 1, wherein the LAN interface further includes means for receiving from each selected node, a message indicating a result of the installation.

4. The apparatus according to claim 1, wherein the processor is further configured to uninstall software on the at least first node that has been selected according to the dependencies.

5. The apparatus according to claim 1, further comprising:
 a user interface for presenting to a user an identifier of the at least first node that has been selected and receiving a user input indicating which software is to be installed on the at least first node that has been selected; and
 wherein the processor is further configured to send at least one of a software module to install and an identification of software to remove, to at least one the at least first node that has been selected, according to the user input.

6. The apparatus according to claim 1, wherein the set of installation metrics further comprises licensing cost.

7. A computer implemented method comprising:
 executing with a processor on an information processing system the following:
  receiving a list of software modules in a software package for installation onto at least one of a plurality of computational nodes communicatively coupled together over a network;

receiving a list of eligible computation nodes to receive the software modules for installation;

storing a set of information comprised in the list of nodes, wherein the set of information comprises information pertaining to dependencies between the list of software modules for installation and any software module installed on a given node of the plurality of nodes, wherein the list of nodes further comprises a set of installation metrics for each node in the list of nodes, wherein the set of installation metrics comprises at least a provisioning latency metric;

assigning a weight to each installation metric in the set of installation metric based on a set of provisioning policies;

determining, for each node in the list of nodes, a cost factor associated with installing the software modules on the node based on each installation metric in the set of installation metrics and the weight assigned to each installation metric; and selecting at least a first node in the plurality nodes for installation of the software modules based at least on the cost factor that has been determined for the at least first node;

installing at least one software module in the list of software modules on the first node;

receiving a job to be scheduled for execution on the first node;

determining that the job is dependent on the at least one software module;

determining that the availability of the set of resources necessary for executing the job on the first node is less than an availability of a set of resources on a second node in the plurality of nodes;

analyzing, in response to determining that the availability of the set of resources necessary for executing the job on the first node is less than an availability of a set of resources on at least the second node, the second node;

determining, in response to the analyzing, that the second node fails to comprise the software module;

determining a first computational cost associated with the first node based on the availability of set of resources at the first node;

determining a second computational cost associated the second node based on a set of installation metrics associated with installing the software module on the second node, wherein the set of installation metrics comprises at least installation time of the software module;

comparing the first computational cost with the second computation cost; and selecting among the first and second nodes the node with a lowest computational cost factor for executing the job.

8. The computer implemented method according to claim 7, further comprising:

installing the software module on the at least first node that has been selected using a package repository.

9. The computer implemented method according to claim 7, further comprising:

receiving from the at least first node that has been selected a message indicating a result of installing the at least one software module thereon.

10. The computer implemented method according to claim 7, further comprising:

uninstalling software on the software module on the at least first node that has been selected according to the dependencies.

11. The computer implemented method according to claim 7, further comprising:

presenting an identifier of the at least first node that has been selected to a user via a user interface;

receiving, via the user interface, a user input indicating which software is to be installed on the at least first node that has been selected; and sending at least one of a software module to install and an identification of software to remove, to the at least first node that has been selected, according to the user input.

12. The computer implemented method according to claim 7, wherein the set of installation metrics further comprises licensing cost.

13. A computer program product comprising:

a non-transitory storage medium readable by a processing circuit and storing instructions for execution by the processing circuit for performing a method comprising:

receiving a list of software modules in a software package for installation onto at least one of a plurality of computational nodes communicatively coupled together over a network;

receiving a list of eligible computation nodes to receive the software modules for installation;

storing a set of information comprised in the list of nodes, wherein the set of information comprises information pertaining to dependencies between the list of software modules for installation and any software module installed on a given node of the plurality of nodes, wherein the list of nodes further comprises a set of installation metrics for each node in the list of nodes, wherein the set of installation metrics comprises at least a provisioning latency metric;

assigning a weight to each installation metric in the set of installation metric based on a set of provisioning policies;

determining, for each node in the list of nodes, a cost factor associated with installing the software modules on the node based on each installation metric in the set of installation metrics and the weight assigned to each installation metric; and selecting at least a first node in the plurality nodes for installation of the software modules based at least on the cost factor that has been determined for the at least first node;

installing at least one software module in the list of software modules on the first node;

receiving a job to be scheduled for execution on the first node;

determining that the job is dependent on the at least one software module;

determining that the availability of the set of resources necessary for executing the job on the first node is less than an availability of a set of resources on a second node in the plurality of nodes;

analyzing, in response to determining that the availability of the set of resources necessary for executing the job on the first node is less than an availability of a set of resources on at least the second node, the second node;

determining, in response to the analyzing, that the second node fails to comprise the software module;

determining a first computational cost associated with the first node based on the availability of set of resources at the first node;

determining a second computational cost associated the second node based on a set of installation metrics associated with installing the software module on the second node, wherein the set of installation metrics comprises at least installation time of the software module;

comparing the first computational cost with the second computation cost; and selecting among the first and second nodes the node with a lowest computational cost factor for executing the job.

14. The computer program product according to claim 13, wherein the method further comprises:

installing the software module on the at least first node that has been selected using a package repository.

15. The computer program product according to claim 13, wherein the method further comprises:

receiving from the at least first node that has been selected a message indicating a result of installing the at least one software module thereon.

16. The computer program product according to claim 13, wherein the method further comprises:

uninstalling software on the software module on the at least first node that has been selected according to the dependencies.

17. The computer program product according to claim 13, wherein the method further comprises:

presenting an identifier of the at least first node that has been selected to a user via a user interface;

receiving, via the user interface, a user input indicating which software is to be installed on the at least first node that has been selected; and sending at least one of a software module to install and an identification of software to remove, to the at least first node that has been selected, according to the user input.

18. The computer program product according to claim 13, wherein the set of installation metrics further comprises licensing cost.

* * * * *